(12) United States Patent
MacDougall

(10) Patent No.: US 7,344,258 B2
(45) Date of Patent: Mar. 18, 2008

(54) FORWARD VIEW APPARATUS FOR MOTOR VEHICLES

(76) Inventor: Craig Hart MacDougall, 45 Alex Ave., Moorabbin, Victoria (AU) 3189

( * ) Notice: Subject to any disclaimer, the term of this patent is extended or adjusted under 35 U.S.C. 154(b) by 0 days.

(21) Appl. No.: 11/735,129

(22) Filed: Apr. 13, 2007

(65) Prior Publication Data
US 2007/0183027 A1 Aug. 9, 2007

Related U.S. Application Data

(62) Division of application No. 10/545,684, filed on Aug. 15, 2005, now abandoned.

(30) Foreign Application Priority Data

| Feb. 13, 2003 | (AU) | ............................. 2003900638 |
| Dec. 5, 2003 | (AU) | ............................. 2003906716 |
| Feb. 12, 2004 | (WO) | ................... PCT/AU04/00155 |
| Jul. 4, 2004 | (AU) | ............................. 2003903410 |

(51) Int. Cl.
*G02B 5/08* (2006.01)
*G02B 5/10* (2006.01)
*G02B 7/182* (2006.01)
*B60R 1/10* (2006.01)

(52) U.S. Cl. .................... 359/509; 359/857; 359/862; 359/863; 15/250.001; 15/250.01

(58) Field of Classification Search .............. 359/507, 359/512, 856, 857, 858, 861, 862, 863, 509; 15/250.001, 250.01
See application file for complete search history.

(56) References Cited

U.S. PATENT DOCUMENTS

| 1,222,156 A | * | 4/1917 | Steinmetz .................. 359/509 |
| 2,674,921 A | * | 4/1954 | Williams ................... 359/862 |
| 2,854,882 A | * | 10/1958 | Cooper ...................... 356/17 |
| 3,510,193 A | * | 5/1970 | La Roche .................. 359/509 |
| 3,697,157 A | * | 10/1972 | Pizzimenti et al. ......... 359/509 |
| 4,268,120 A | | 5/1981 | Jitsumori |
| 4,685,779 A | | 8/1987 | Gonzalez |
| 4,964,712 A | * | 10/1990 | Anderson .................. 359/405 |
| 5,644,443 A | * | 7/1997 | Hung ........................ 359/856 |

(Continued)

FOREIGN PATENT DOCUMENTS

| CA | 2228825 A1 | 10/1999 |
| DE | 3509792 A1 | 9/1986 |
| GB | 2208633 A | 4/1989 |
| WO | 1986005749 A1 | 10/1986 |

(Continued)

*Primary Examiner*—Ricky D. Shafer
(74) *Attorney, Agent, or Firm*—Richard M. Goldberg

(57) ABSTRACT

Forward view apparatus (10) for a motor vehicle, to enable the driver of the vehicle to view an image of objects which are located forward of the apparatus (10), includes a housing (12) in which a rear view mirror (14) is located. A two-mirror arrangement (20, 24) within the housing (12) provides an image of objects forward of the assembly (10) in a viewing portal (16). The first mirror (20) is planar and adjustable. A second mirror (24) is fixed and has a curved reflecting surface. The reflecting surface of the fixed mirror (24) is aspheric, spherical, substantially spherical, parabolic or quasi-parabolic. A window (26) is provided on the forward side of the housing, to enable light to pass to the two-mirror arrangement (20, 24). A shutter (332) is able to close across the window (26) to prevent bright lights or other distracting images being seen by the driver.

10 Claims, 11 Drawing Sheets

U.S. PATENT DOCUMENTS 5,835,294 A     11/1998  Minegishi
6,012,819 A *   1/2000   Pai .............................. 359/855
6,183,096 B1    2/2001   Galicia
6,250,766 B1 *  6/2001   Strumolo et al. ........... 359/857

* cited by examiner

FORWARD VIEW APPARATUS FOR MOTOR VEHICLES

CROSS REFERENCE TO RELATED APPLICATIONS

This application is a divisional application of U.S. patent application Ser. No. 10/545,684, filed on Aug. 15, 2005, now abandoned.

BACKGROUND OF THE INVENTION

This invention relates to forward viewing apparatus, and in particular relates to forward-viewing apparatus for use on vehicles such as motor vehicles.

It is said that a driver of a motor vehicle should, when driving in a stream of traffic, always drive two or three cars ahead. That expression means that a driver should look ahead to a vehicle two or three vehicles in front of his or her own, so that the driver may react to any change of direction, or more importantly speed, of that vehicle, rather than wait for such a change in the vehicle immediately in front of his or her own.

However, in the traffic mix these days in, for example, Australian cities, it is becoming more and more difficult to drive two or three vehicles ahead, because drivers often cannot see past the vehicle immediately in front of his or her vehicle. Many vehicles now have heavily tinted windows, which makes it difficult or impossible to see through a car or station wagon to vehicles in front of it. Furthermore, there are many more trucks, vans, and in particular four wheel drive "recreational vehicles", which either do not have any windows, or have heavily tinted windows, or simply ride too high for a driver to see past them.

There have been some attempts to provide mechanisms for forward-view mirrors, to enable a driver to see around such a vehicle which is immediately in front of the driver's vehicle. U.S. Pat. No. 4,685,779, apart from providing in the "Background of the Invention" section of the specification a brief description of the problem, and a useful summary of pre-1986 prior art, discloses a complicated combined forward and rearward viewing mirror assembly, having three mirrors in two body members, one of which members is attached to the door of the vehicle, and the other one of the members is coupled to the first body member by means of a linkage.

U.S. Pat. No. 4,268,120 describes a forward-view mirror arrangement adapted to be located on the opposite side of a vehicle to the driver of that vehicle, such that "dead angles" may be eliminated. FIG. 3 of U.S. Pat. No. 4,268,120 shows a two-mirror arrangement for directing light entering a housing through a transparent cover to the driver of the vehicle.

Despite the existence of conceptual forward-view mirrors, as exemplified by U.S. Pat. Nos. 4,685,779 and 4,268,120, current motor vehicles do not feature forward-view mirrors.

NMRA Insurance, an Australian insurance company, released, on 31 Oct. 2002, a "World First Reversing Visibility Index", which resulted from measurements of the visibility from the drivers seat of a vehicle "out the back of a car". Many vehicles tested had large blind spots behind the vehicle. In media coverage of the Index, it was suggested that one way of overcoming a blind spot problem was to install a video camera at the rear of a vehicle, pointing rearwards, the camera being linked to a small LCD screen located in the internal rear view mirror. However, the cost of such an arrangement was suggested to be in the order of $1,500. Such a figure would be in general applicable to a forward-view arrangement, except that ideally two cameras, one on each side of the vehicle, and two screens, would be required. That would double the cost, making it prohibitive for most persons.

SUMMARY OF THE INVENTION

It is an object of this invention to provide an effective, relatively simple, arrangement for providing forward viewing in a motor vehicle.

The invention provides forward view apparatus for a motor vehicle, which apparatus provides an image from a location forward of the assembly, said image being able to be viewed by the driver of said vehicle, characterised in that said apparatus includes a two-mirror arrangement, and in that one of the mirrors of said two-mirror arrangement has a curved surface.

The invention also provides forward view apparatus for a motor vehicle, which apparatus provides an image from a location forward of the assembly, said image being able to be viewed by the driver of said vehicle, characterised in that light from a location forward of the assembly passes through a window and is reflected by said two-mirror arrangement through a viewing portal to the eyes of the driver of the vehicle, and in that said viewing portal is located on the inboard side of said arrangement.

The invention further provides forward view apparatus for a motor vehicle, which apparatus provides an image from a location forward of the assembly, said image being able to be viewed by the driver of said vehicle, characterised in that there are shutter means adapted to move between a closed position and an open position, in that in said closed position light is prevented from reaching said apparatus, and in that in said open position light is able to reach said apparatus.

The invention also provides forward view apparatus for a motor vehicle, which apparatus provides an image from a location forward of the assembly, said image being able to be viewed by the driver of said vehicle, characterised by an arrangement to produce, when said vehicle is in forward motion, an air flow across said window for removal of water and/or other material and/or the prevention of the adhering of water and/or other material to said window.

BRIEF DESCRIPTION OF THE DRAWINGS

Embodiments of the invention, which may be preferred, will be described in detail hereinafter with reference to the accompanying drawings, in which.

DETAILED DESCRIPTION

Figure 1:
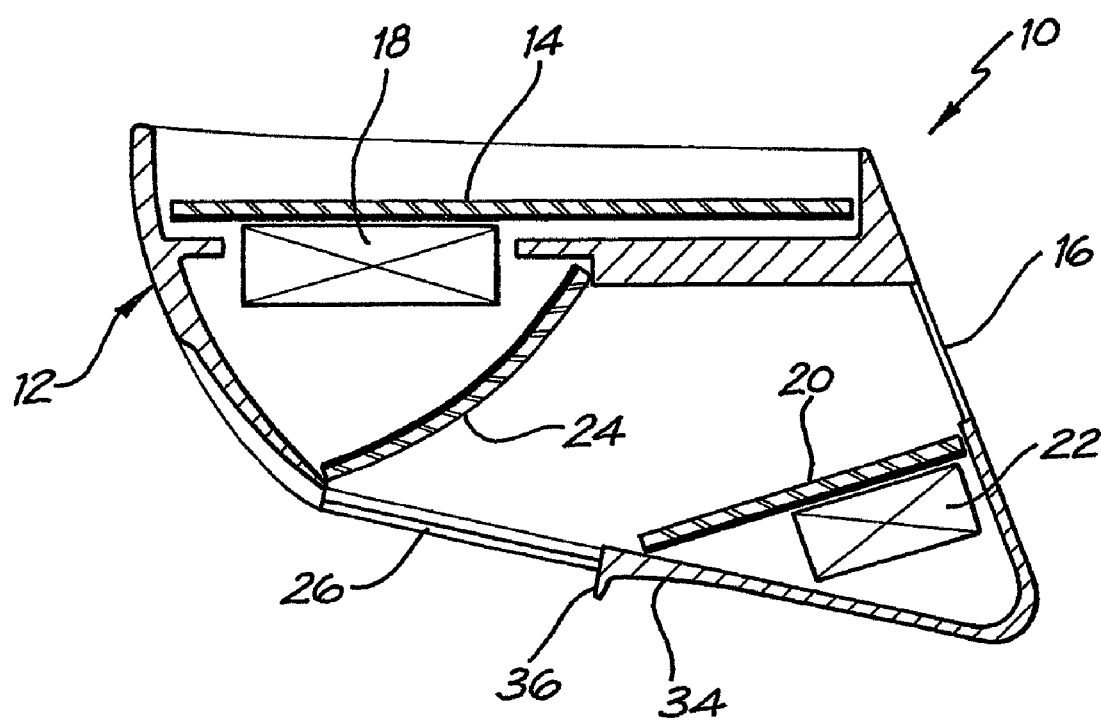
FIG. 1 is a section through a first embodiment of a forward-view assembly according to the present invention.
Figure 2:
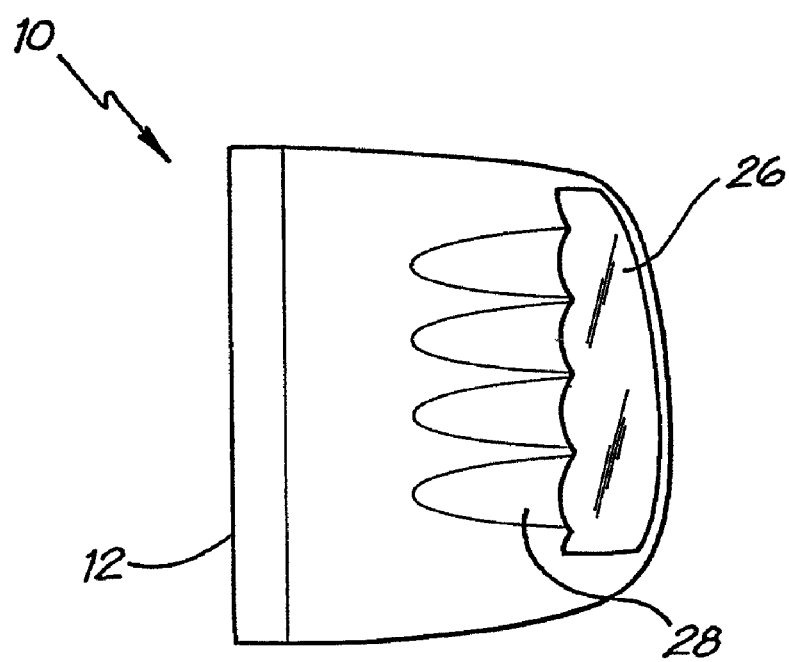
FIG. 2 is an end elevation of the assembly of FIG. 1.

The drawings show a right hand side forward-view apparatus 10 according to the present invention adapted to be located on a motor vehicle (not shown) in the position in which a conventional rear-view mirror is located, although it must be understood that the same assembly or a mirror-image (about a line from the front to the rear of a vehicle) assembly may be provided in the left hand position. It is also to be understood that the mirror assembly is suitable for left hand drive vehicles as well as right hand drive vehicles.

In the drawings, the right hand forward view apparatus 10 includes a housing 12 which may be generally similar to prior art housings for rear view wing mirrors, such housings for rear view mirror arrangements being normally formed from plastics material and having a cup shape in which a rear view mirror 14 is located.

Throughout this specification, it is to be understood that the term "front" has the same meaning as the front of the vehicle to which an assembly of the invention may be attached, and the term "rear" has the same meaning as the rear of such a vehicle.

Preferably, the housing 12 is adapted to be attached to the body of a right hand drive vehicle (not shown) just forward of the driver's door, but may be located in any suitable position. The housing 12 contains at its rear a first mirror or the like 14, which is preferably a conventional rear-view mirror adapted to be used by the driver of the vehicle to look towards the rear of the vehicle. Of course, the image in that mirror is reversed.

Figure 3:
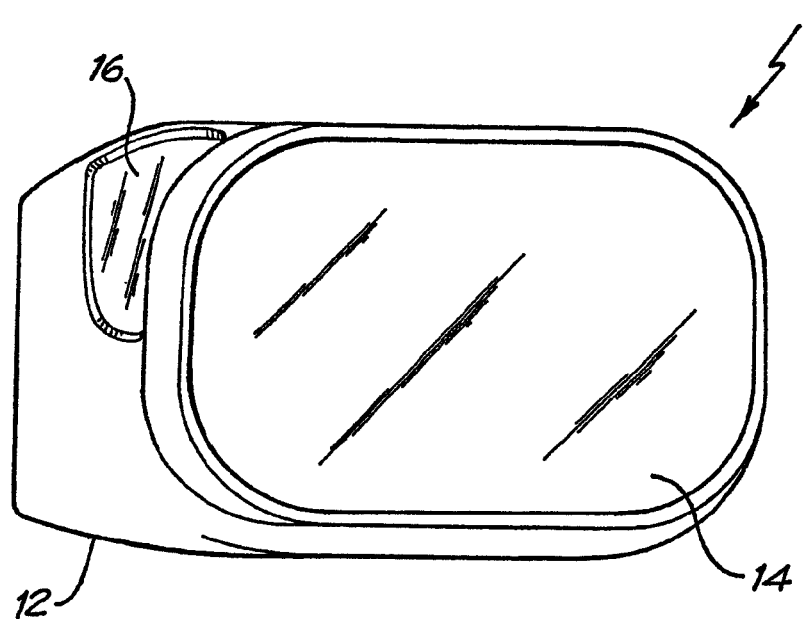
FIG. 3 is a front elevation of the assembly of FIG. 1.
Figure 4:
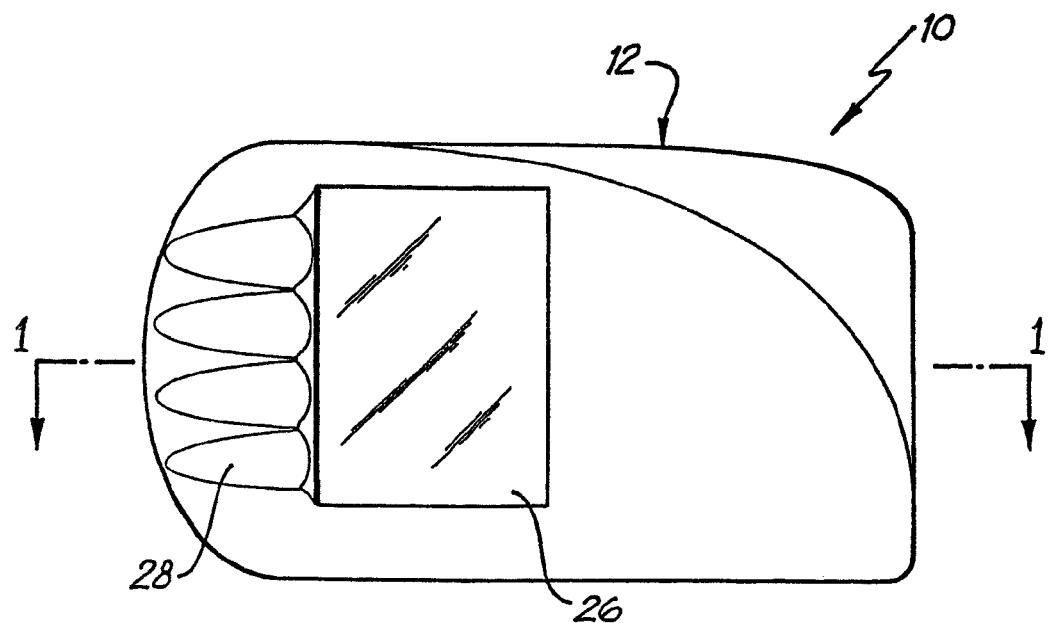
FIG. 4 is a rear elevation of the assembly of FIG. 1.

Referring now specifically to FIGS. 1 to 4, it should be noted that the section of FIG. 1 is along the lines 1-1 of FIG. 4. In this embodiment, the mirror arrangement 10 is preferably mounted on a pivoting breakaway point. The arrangement 10 is a separate, self-contained unit which is spaced form the vehicle, allowing the airflow created by the motion of the vehicle to pass between the car and the arrangement.

In the first embodiment of the present invention, there is a forward viewing area 16 in which the driver may see a forward-view image when he or she is desirous of looking forward, past a vehicle immediately in front of the vehicle he or she is driving, to a vehicle forward of that vehicle immediately in front of the driver's vehicle. Preferably, the portal 16 is an opening, through which the driver may see light which has passed from the front of the vehicle through the assembly 10.

In this embodiment, the forward viewing portal 16 is located at the side of the housing 12 of the arrangement 10, with the viewing line passing behind the rear view mirror 14 and in front of the pivotal mounting point (not shown) for the arrangement 10.

In FIG. 1, rear view mirror 14 is adjusted by means of a motor 18, in a conventional manner. The forward view mirror arrangement of the embodiment of FIGS. 1 to 4 includes a first mirror 20. The first mirror 20 is preferably planar, and is also preferably adjustable, manually or by use of a motor 22, which may be in an offset position. A second mirror 24 is located within housing 12. Second mirror 24 is preferably fixed, that is, non-adjustable, and is also preferably curved. More preferably, the mirror 24 is aspheric, spherical, substantially spherical, parabolic or quasi-parabolic. However, the curvature of mirror 24 could take any form. For example, the mirror 24 may have a convex lower portion, and a substantially planar upper portion, or such an arrangement could be a side-to-side arrangement.

A window 26 is provided on housing 12, for light to reach the forward view mirror arrangement. The window 26 is clear, is preferably a sealed clear window, and is preferably formed from glass or acrylic material. The shape of the window 26 preferably follows the curvature of the front of housing 12, but to maximise the forward view and to assist in the repelling of water from the surface of the window, the window 26 is preferably outwardly curved or convex, and is also preferably located towards the outer perimeter of the housing 12. A venturi and vortex arrangement 28, as described in related applications, may also be included to aid in keeping the window 26 clear of water and debris.

Light from the front of the vehicle to which the arrangement 10 is attached initially strikes fixed mirror 24, is reflected to adjustable mirror 20 and is again reflected through forward viewing portal 16 to the eye of the driver of the vehicle. In the embodiment of FIGS. 1 to 4, the arrangement 10 is preferably only be used for viewing through the driver's window, or the passenger's window for the opposite side of the vehicle to that of the driver.

Figure 5:
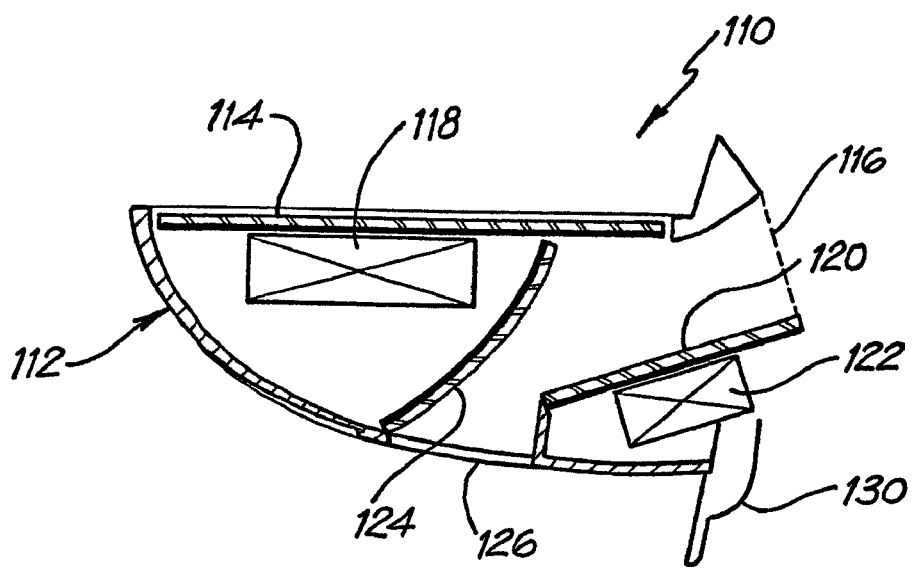
FIG. 5 is a section through a second embodiment of a forward-view assembly according to the present invention.
Figure 6:
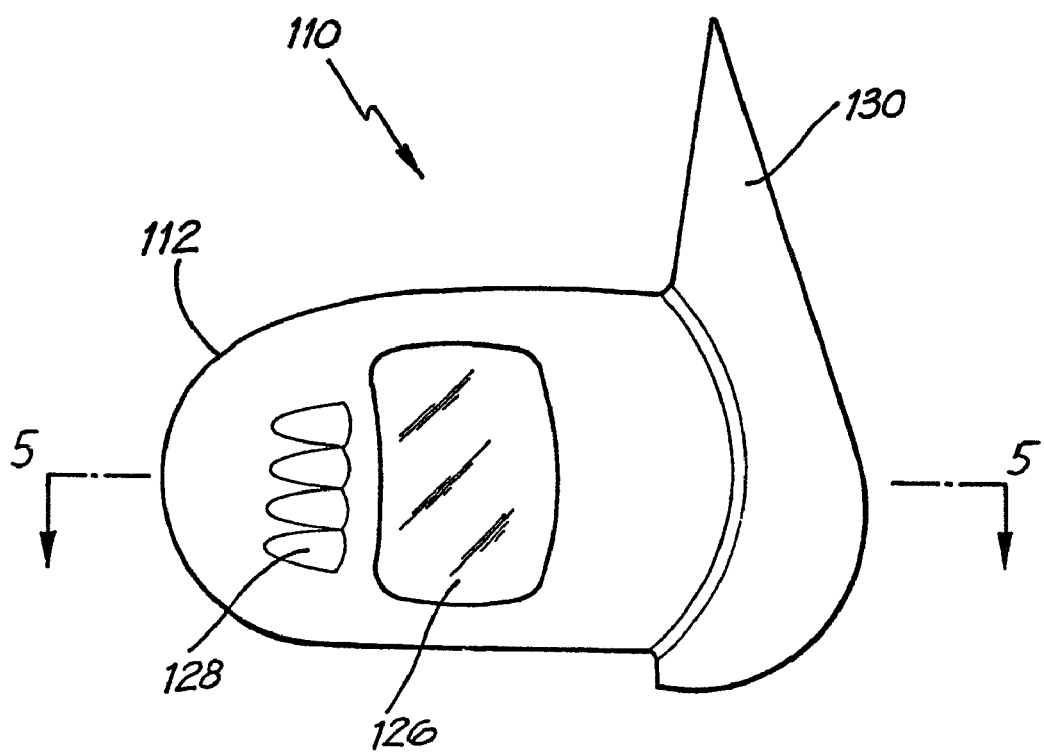
FIG. 6 is a front elevation of the embodiment of FIG. 5.
Figure 7:
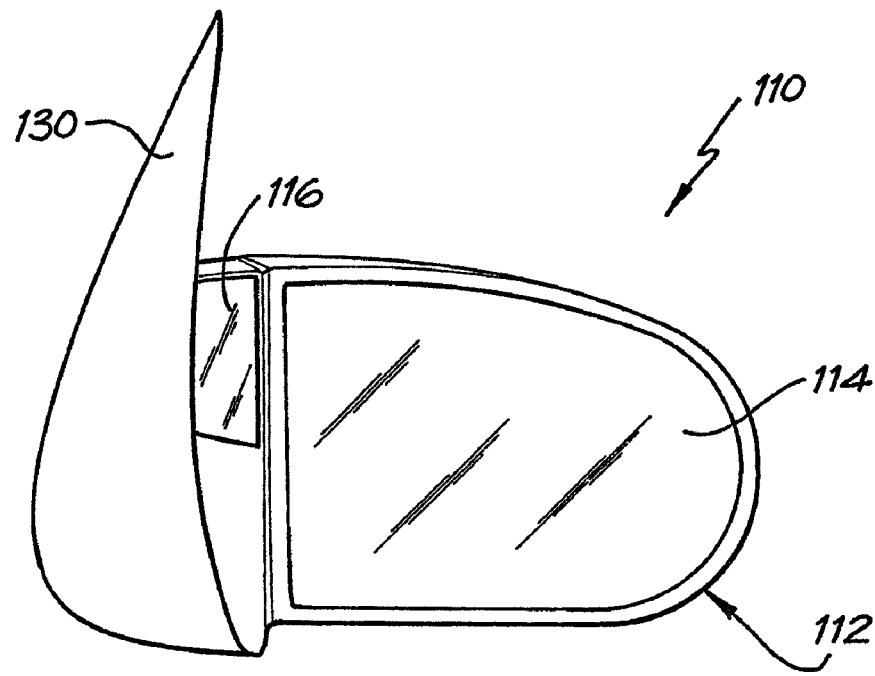
FIG. 7 is a rear elevation of the assembly of FIG. 5.

In FIGS. 5 to 7, a second embodiment of the invention is shown. The section of FIG. 5 is along the lines A-A of FIG. 6. In this embodiment, a forward view assembly 110 has a housing (similar generally to housing 12 of FIGS. 1 to 4) is preferably integrated with the body (the triangular door/window mounting plate of which is shown at 130) of a vehicle to which the arrangement is attached. Thus, air cannot pass between the arrangement 110 and the vehicle, unlike the situation described in relation to FIGS. 1 to 4.

Arrangement 110 has a conventional rear view mirror 114, adjustable in a conventional manner by a motor 118. A forward view portal 116 is located in the side of the housing 112. A first, inboard, mirror 120 is located in housing 112, but preferably extends beyond the housing as shown in FIG. 5. The first mirror 120 is preferably planar, and is also preferably adjustable, manually, or by use of a motor 122.

A second mirror 124 is located within housing 112. Second mirror 124 is preferably fixed, that is, non-adjustable, and is also preferably curved. More preferably, the mirror 124 is aspheric, spherical or substantially spherical, parabolic or quasi-parabolic. However, the curvature of mirror 124 could take any form. For example, the mirror 124 may have a convex lower portion, and a substantially planar upper portion, or such an arrangement could be a side-to-side arrangement.

A window 126 is provided on housing 112, for light to reach the forward view mirror arrangement. The window 126 is clear, is preferably a sealed clear window, and is preferably formed from glass or acrylic material. The window 126, in this embodiment, is more centrally located on housing 112, as shown in FIG. 6. This allows for peripheral indicators (not shown) to be accommodated on the housing 112, and for more centralised mounting of the motor 122.

The shape of the window 126 preferably follows the curvature of the front of housing 112, but to maximise the forward view and to assist in the repelling of water from the surface of the window, the window 126 is preferably outwardly curved or convex, and is also preferably located towards the outer perimeter of the housing 112. A venturi and vortex arrangement 128, as described in relation to FIGS. 1 to 4, may also be included to aid in keeping the window 126 clear of water and debris.

Light from the front of the vehicle to which the arrangement 110 is attached initially strikes fixed mirror 124, is reflected to adjustable mirror 120 and is again reflected through forward viewing portal or area 116 to the eye of the driver of the vehicle. In the embodiment of FIGS. 5 to 7, the arrangement 110 is preferably only used for viewing through the driver's window, or the passenger's window for the opposite side of the vehicle to that of the driver.

Figure 8:
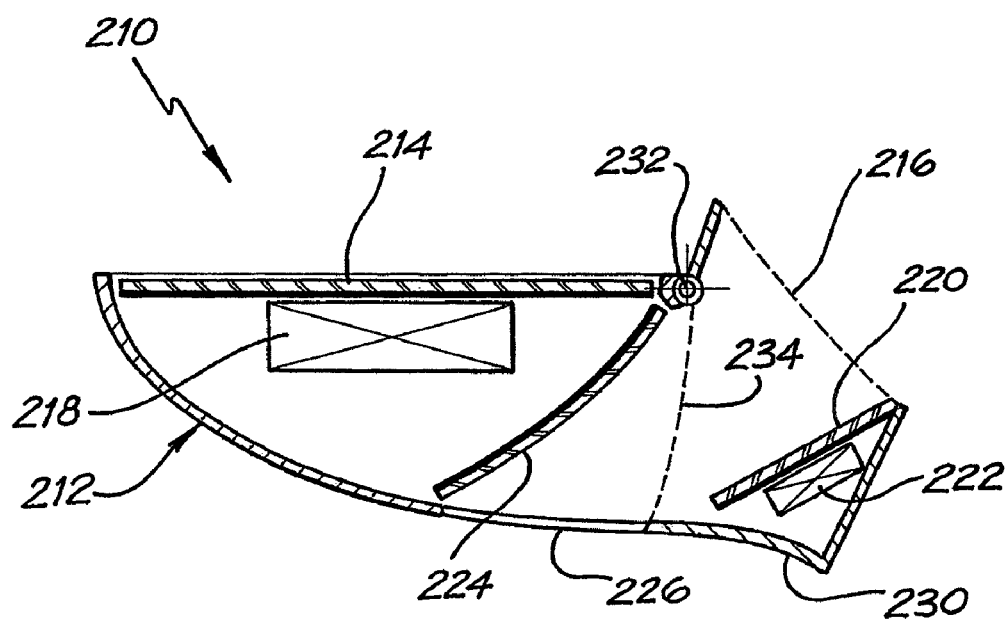
FIG. 8 is a sectional view of a third embodiment of the invention according to the present invention.
Figure 9:
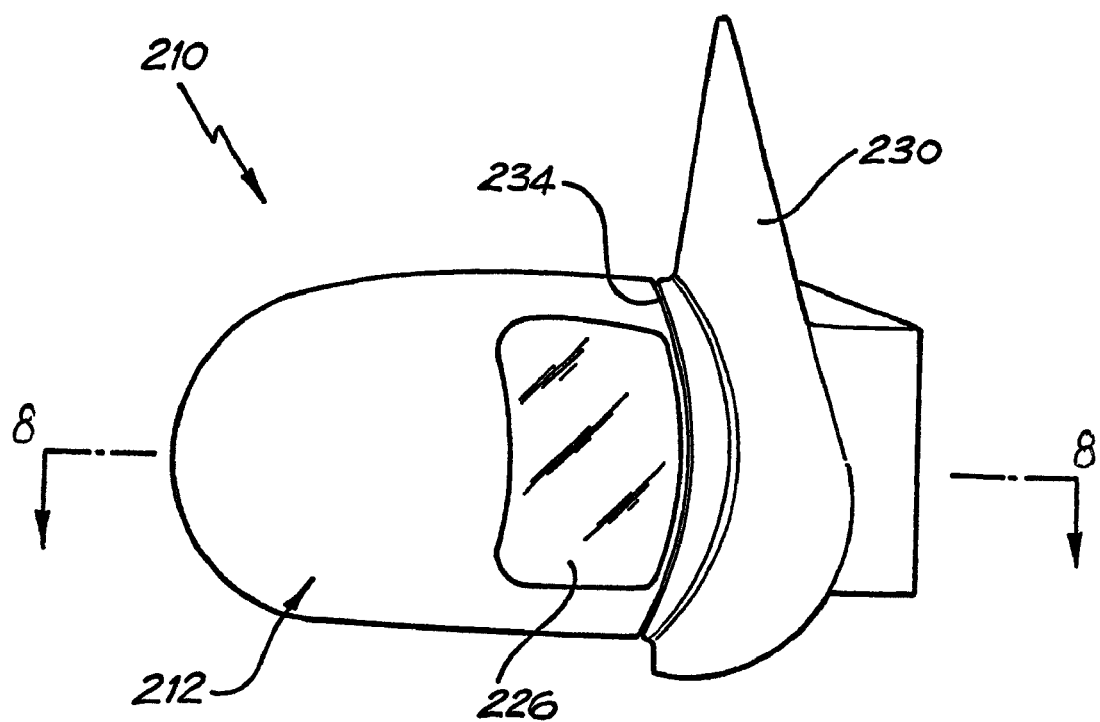
FIG. 9 is a front elevation of the arrangement of FIG. 8.
Figure 10:
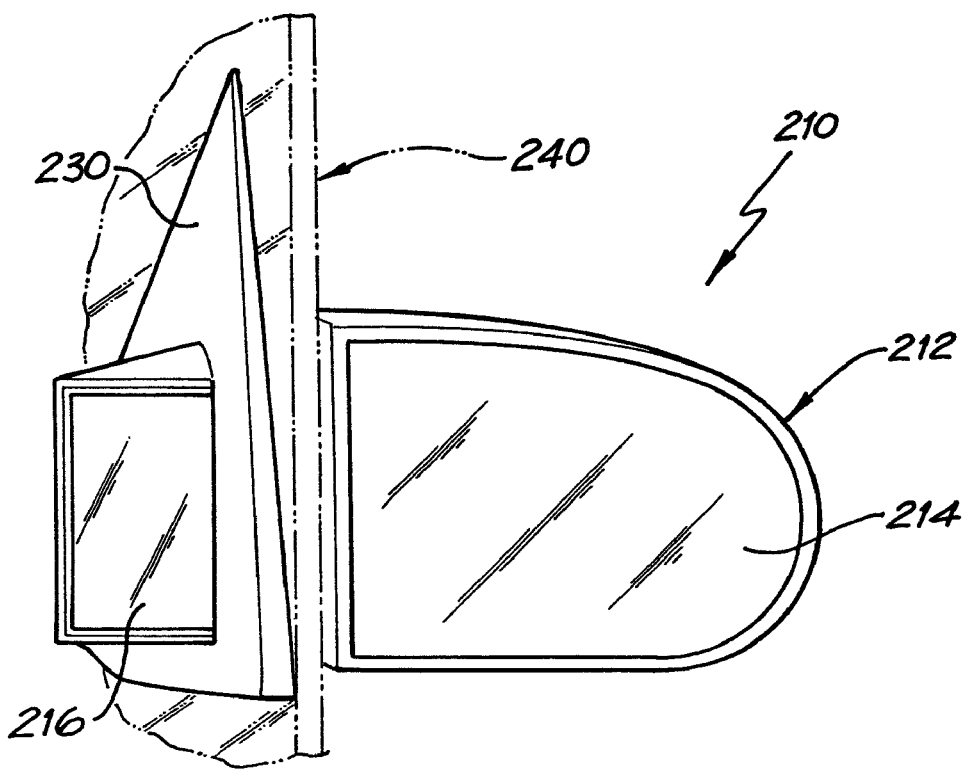
FIG. 10 is a rear elevation of the arrangement of FIG. 8.

The third embodiment of the present invention is shown in FIGS. 8 to 10. The section of FIG. 8 is along the lines A-A of FIG. 9. In this embodiment, a forward view assembly 210 has a housing (similar generally to housing 12 of FIGS. 1 to 4) is preferably integrated with the body (the triangular door/window mounting plate of which is shown at 230) of a vehicle to which the arrangement is attached, in a similar manner to the embodiment of FIGS. 5 to 7. Thus, again, air cannot pass between the arrangement 210 and the vehicle, unlike the situation described in relation to FIGS. 1 to 4.

Arrangement 210 has a conventional rear view mirror 214, preferably adjustable in a conventional manner by a motor 218. A forward view portal 216 is located in the housing 212 on the inboard side of mirror 214. A first, inboard, mirror 220 is located in door/window mounting plate or bracket 230 (FIG. 8). The first mirror 220 is preferably planar, and is also preferably adjustable, manually, or by use of a motor 222. A pivot point 232 aft of the mirror 220 and motor 222 allows the arrangement 210 to fall back against the body of the vehicle, rearwards of the mounting plate 230, if it is hit, or for parking. The housing 212 of the arrangement 210 separates from the mounting plate 230 along a breakaway line 234 outboard of the mirror 220. The extended flange on the window is adapted to engage with an imbedded O ring (not shown) for sealing when the housing 212 returns to its operational position. Movement of the housing 212 about pivot point 232 may be effected manually or by using a motor or the like (not shown).

The viewing portal, in the embodiment of FIGS. 8 to 10, facilitates viewing through the mounting plate 230, that is, through the door 240 rather than through the vehicle window as in the other embodiments.

A second mirror 224 is located within housing 212. Second mirror 224 is preferably fixed, that is, non-adjustable, and is also preferably curved. More preferably, the mirror 224 is aspheric, spherical, substantially spherical, parabolic or quasi-parabolic. However, the curvature of mirror 224 could take any form. For example, the mirror 224 may have a convex lower portion, and a substantially planar upper portion, or such an arrangement could be a side-to-side arrangement.

A window 226 is provided on housing 212, for light to reach the forward view mirror arrangement. The window 226 is clear, is preferably a sealed clear window, and is preferably formed from glass or acrylic material. The shape of the window 226 preferably follows the curvature of the front of housing 212, but to maximise the forward view and to assist in the repelling of water from the surface of the window, the window 226 is preferably outwardly curved or convex, and is also preferably located towards the inner perimeter of the housing 212. A venturi and vortex arrangement, as described in related applications, may also be included to aid in keeping the window 226 clear of water and debris.

Light from the front of the vehicle to which the arrangement 210 is attached initially strikes fixed mirror 224, is reflected to adjustable mirror 220 and is again reflected through forward viewing portal 216 to the eye of the driver of the vehicle. As described hereinbefore, the viewing portal 226 is preferably located within mounting plate 230. Such an arrangement facilitates a method of viewing the forward view mirror arrangement 210 from within the vehicle. The benefits of this feature are twofold. Firstly, a delineated boundary is created between the rear view mirror 214 and the forward view mirror 220, when the driver looks into the arrangement 210. Secondly, because the portal 216 is in communication both with the interior of the arrangement 210 and that of the vehicle, the mirrors 220 and 224 are less likely to fog up, as the interior of the arrangement is kept at or near the ambient temperature of the interior of the vehicle, thus cleaning or demisting the mirrors.

Mounting of the rear view mirror motor 218 may be central in the arrangement 210, or may be as it is in conventional rear view mirrors. The adjustable mirror 220 and associated motor 222, being located within mounting plate 230, in the door of the vehicle, and being located somewhat further forward, may facilitate improved viewing, particularly on the driver's side. It is believed that the actual size of the wing mirrors (housings 212 of arrangement 210) would be in general no larger than existing wing mirrors. The peripheral indicators, mentioned hereinbefore, may be accommodated within housing 212 with minimal modification. The mirror 224 may be moved outboard from the position shown in FIG. 8, if no indicator is required, which would facilitate a slightly improved view. Both driver's side and passenger side portals (216 and not shown) are readily visible without the need to look through the side windows.

As far as the configuration of the mirrors 20, 120, 220, 24, 124 and 224 is concerned, the major problem involved visibility through the left and right viewing portals 16, 116, 216. By moving the mirror 20/120/220 and the associated motor 24/214/224 forward (which is more readily achieved when those components are built into the door, as in arrangement 210) the angle of the mirror 20/120/220 may be set at approximately right angles to the vehicle. Preferably, the mirror 20/120/220 is tilted back approximately 5°, and mirror 24/124/224 is set at an angle of approximately 50° to approximately 60° to the vehicle. Where mirror 24/124/224 is aspheric, a greatly enhanced view of the front wheel of the vehicle, along the side of the bonnet of the vehicle, and approximately 200 meters ahead may be achieved on the passenger side. On the driver's side, by rotating mirror 20/120/220 approximately 10°, and by tilting mirror 20/120/220 back approximately 5°, a similar result is achieved.

It has been found that a parabolic mirror, used as a mirror 24/124/224, was not very satisfactory, as it was felt that its curvature was too great, providing as a result too much of a peripheral view to the left and the right. It is felt that an aspheric mirror, flatter in profile that a parabolic mirror, addressing both distance and the positioning of the front wheel of the vehicle, would be more desirable.

Figure 11:
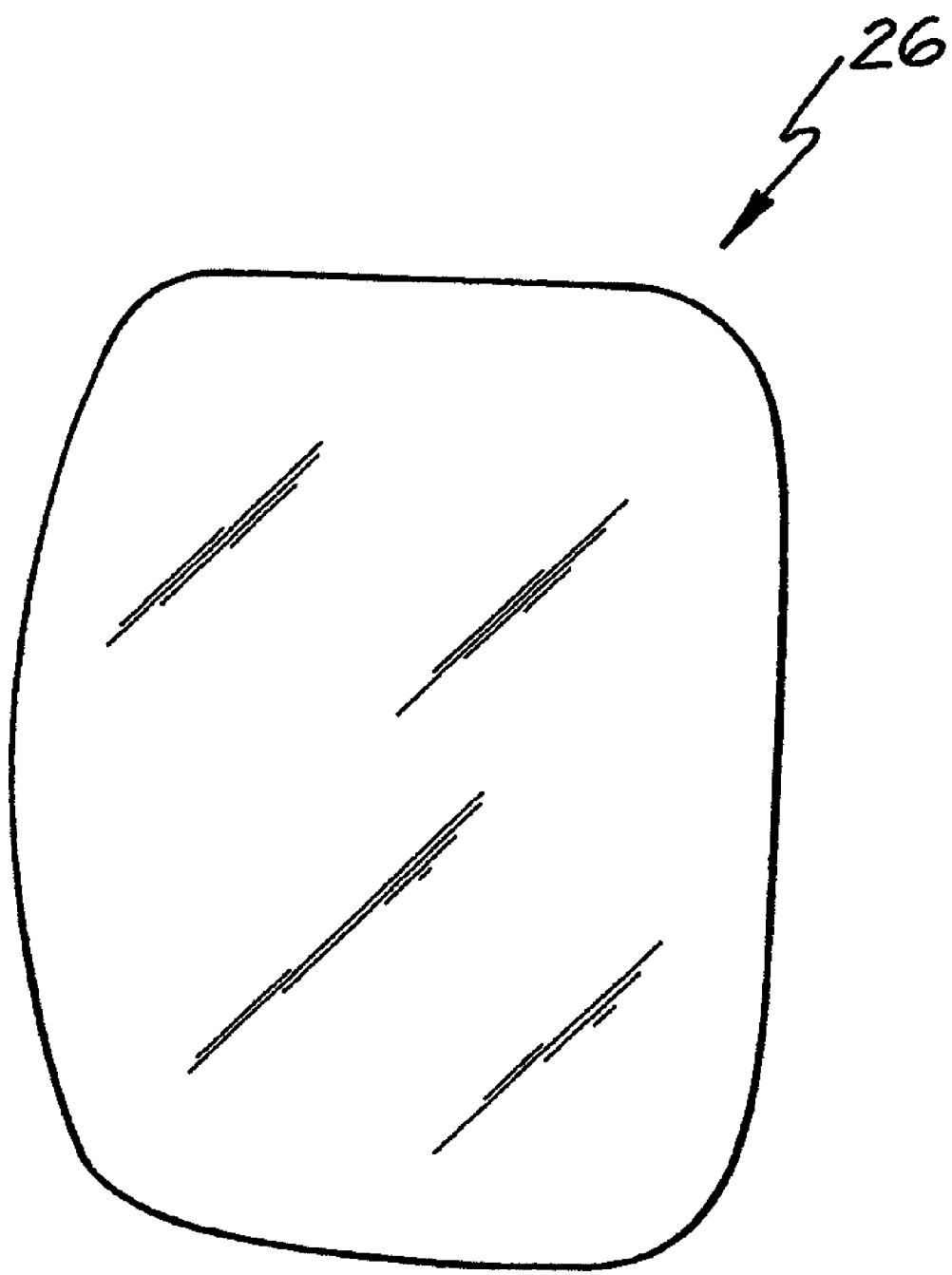
FIG. 11 is an elevation of one exemplary window in accordance with the present invention.

Turning now to the windows 26, 126, 226, FIG. 11 shows a preferred shape for such a window. The window 26 illustrated is exemplary of a window for a driver's side arrangement 10 for a right hand drive vehicle, and a mirror-image may be used for the passenger side of such a vehicle. Although the window is shown as 226, it could be a window 26 or 126. In all three embodiments, the window 26/126/226 is preferably curved or convex to follow the normal shape of a wing mirror arrangement, in an endeavour to minimise water retention. The viewing glass or acrylic window 26/126/226 is preferably sealed and airtight, that is, as far as allowing water, debris and so on into the interior of arrangement 10/110/210. The position and angle of the arrangement 10/110/210 means that water and road grime will be deflected off the windscreen of the vehicle and across the front surface of the viewing window 26/126/226. To counteract this and to facilitate clean viewing through the window 26/126/226, a concave surface portion 34 (FIG. 1) inboard of the window 26, is provided. Surface portion 34, together with a protrusion or wing 36, located between the window 26 and the surface area 34, comprises a system which gathers and disperses water, debris and so on. Any water, road grime and the like which does land on the surface of window 26 is moved sideways and across the window 26 by the venturi vortex 28 described in earlier associated applications. Although the features 34 and 36 have been described in relation to the embodiment of FIGS. 1 to 4, it is to be understood that they are equally applicable to the embodiments of FIGS. 5 to 7 and 8 to 10.

As has been stated, a similar unit may (in the case of a right hand drive vehicle) be located on the left hand side of the vehicle, to look forward along the left side of the vehicle. Preferably, both assemblies 10, 110, 210, would have mirror adjustments by electric motors, operable from a position conveniently close to the driver. Alternatively, adjustments may be made manually. Such an alternative is particularly suited to arrangement 220, where a manual adjusting means could be located within reach of the driver/passenger.

Features described in relation to one of the three aforementioned described embodiments of the present invention should be taken to relate to the other two embodiments.

With regard to FIG. 3, by increasing the internal mirror size by approximately 20 mm horizontally, no motor is needed to adjust the adjustable mirror for the different sizes of drivers. This means that the mirror may be fixed in one position. The only movement necessary could be achieved manually when changing from right to left hand drive vehicles, and that could be set in the factory.

Viewing the forward view assembly from inside a vehicle and not through the driver's side window creates far greater differentiation and greater user friendliness. It also means that the inboard and outboard mirrors may be heated from within the vehicle. This negates the need for designated heating within the assembly housing.

Figure 12:
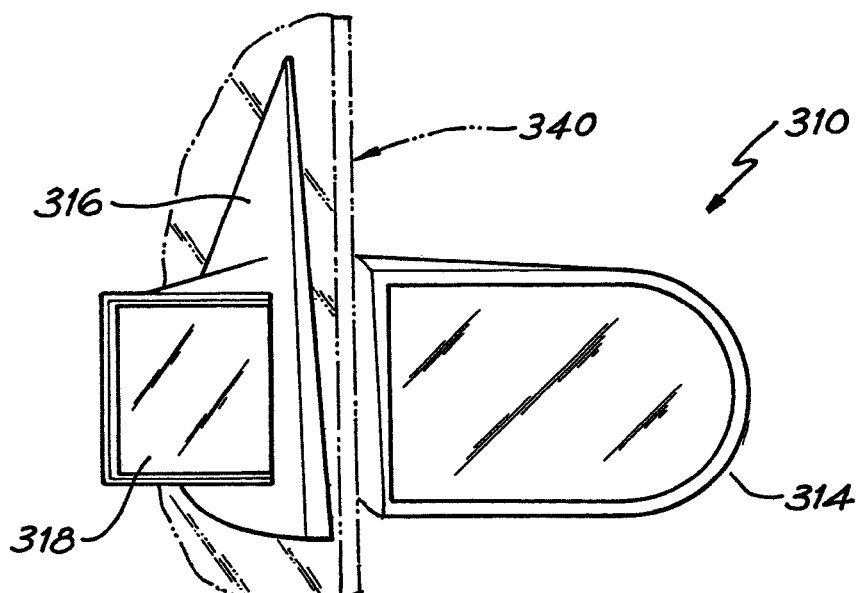
FIG. 12 is a rear elevation of a first embodiment of a forward-view assembly according to the present invention.
Figure 13:
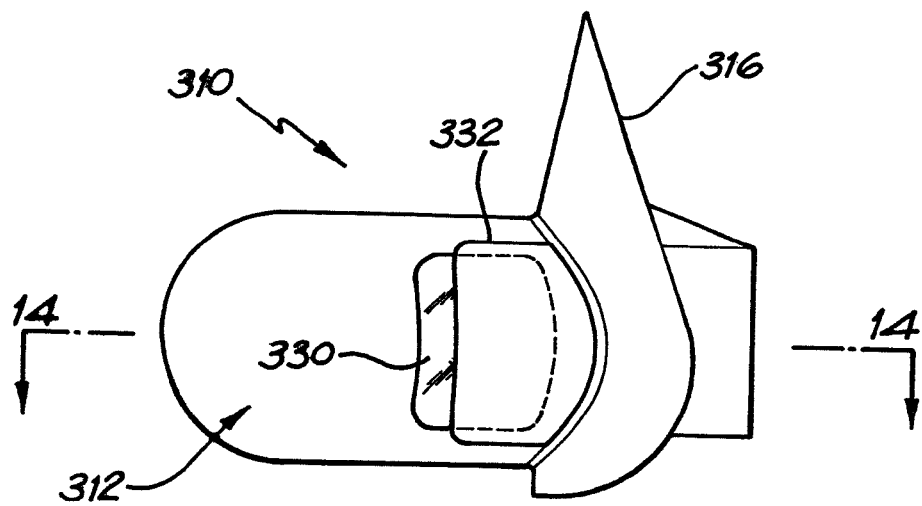
FIG. 13 is a front elevation of the assembly of FIG. 12.
Figure 14:
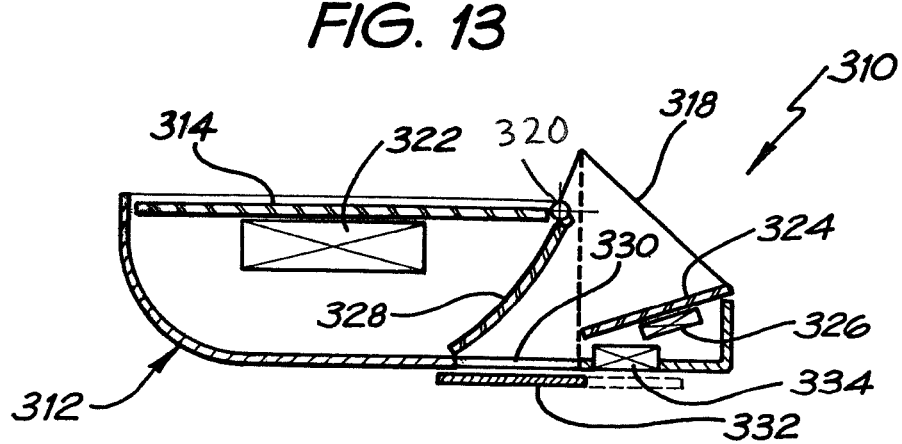
FIG. 14 is a section along the lines 14-14 of FIG. 13.

FIGS. 12 to 17 show another embodiment of forward view apparatus according to the present invention. The apparatus 310 is of the type denoted in earlier drawings figures by reference numerals 10, 110 and 210. The apparatus 310 has a housing 312 which may be adapted to be attached to the body of a right hand drive vehicle (not shown) just forward of the driver's door 340, but may be located in any suitable position. In FIGS. 12 to 14, the housing 312. includes a binnacle 316 which in use may be located along the line of the bodywork of the vehicle, to provide a forward view viewing portal 318 inside the passenger compartment of the vehicle. Of course, the viewing portal may be located anywhere which may be conveniently viewed by the driver of the vehicle.

Referring now specifically to FIGS. 12 to 14, it should be noted that the section of FIG. 14 is along the lines 14-14 of FIG. 13. In this embodiment, the mirror arrangement 10 is preferably mounted on a pivoting breakaway point 320 (FIG. 14). The broken line in FIG. 14 is the "break-away" line where the outer portion of housing 312 breaks away from the remainder as it pivots around point 320.

In the embodiment of FIGS. 12 to 14, the forward viewing portal 318 allows the driver to see a forward-view image when he or she is desirous of looking forward, past a vehicle immediately in front of the vehicle he or she is driving, to a vehicle forward of that vehicle immediately in front of the driver's vehicle. Preferably, the portal 318 is an opening, through which the driver may see light which has passed from the front of the vehicle through the assembly 310.

In this embodiment, the forward viewing portal 318 is located at the side of the housing 312 of the arrangement 310, with the viewing line passing to one side of the rear view mirror 314 and in front of the pivotal mounting point 320 for the arrangement 310.

In FIG. 12, rear view mirror 314 is adjusted by means of a motor 322, in a conventional manner. The forward view mirror arrangement 310 of the embodiment of FIGS. 12 to 14 includes a first mirror 324. The first mirror 324 is preferably planar, and is also preferably adjustable, manually or by use of a motor 326, which may or may not be in an offset position. A second mirror 328 is located within housing 312. Second mirror 328 is preferably fixed, that is, non-adjustable, and is also preferably curved. More preferably, the mirror 328 is aspheric, spherical, substantially spherical, parabolic or quasi-parabolic. However, the curvature of mirror 328 could take any form. For example, the mirror 328 may have a convex lower portion, and a substantially planar upper portion, or such an arrangement could be a side-to-side arrangement.

A window 330 is provided on housing 312, for light to reach the forward view mirror arrangement. The window 330 is clear, is preferably a sealed clear window, and is preferably formed from glass or acrylic material. The shape of the window 330 preferably follows the curvature of the front of housing 312, but to maximise the forward view and to assist in the repelling of water from the surface of the window, the window 330 is preferably outwardly curved or convex, and is also preferably located towards the outer perimeter of the housing 312.

Light from the front of the vehicle to which the arrangement 310 is attached initially strikes fixed mirror 328, is reflected to adjustable mirror 324 and is again reflected through forward viewing portal 318 to the eye of the driver of the vehicle. In the embodiment of FIGS. 12 to 14, the arrangement 310 is preferably only used for viewing through the driver's window, or the passenger's window for the opposite side of the vehicle to that of the driver.

Although previously proposed forward view arrangements generally along the lines of the embodiment of FIGS. 12 to 14 have been seen to have been an aid to enhance driver visibility, some concerns have arisen. These concerns involve such aspects as user friendliness, driver individuality, mistrust, problems with keeping the assembly clean, and problems associated with glare from and damage to the assembly. For example, it is possible that confusion may occur when a driver looks into the mirror assembly, as to which mirror, the rear view mirror or the forward view mirror, the driver is looking at. In addition, to have a forward-view image constantly visible through portal 318 may be distracting to a driver. It is also possible that a driver may be dazzled by the lights of an oncoming vehicle being reflected into his or her eyes through the forward view apparatus. Finally, the front (exterior surface) of window 330 may become opaque through a build-up of road dirt or the like, lessening the quality of the forward view image, or even rendering the apparatus useless if the build-up is allowed to continue. Keeping the window 330 clean without wind deflectors, vortex channels, small windscreen wipers or water jets has been an ongoing difficulty.

In order to address these matters, the embodiment of FIGS. 12 to 14 includes a shutter 332 which is preferably adapted to slide across window 330 to block light entering the window 330. A motor 334 is adapted to actuate shutter 332, to move it between an open and a closed position. The motor 334 may be generally similar to motors 322 and 326.

The shutter 332 may slide on tracks (not shown), or may be pivoted, depending on the mirror housing 312 profile. Movement across the window 330 may be achieved through use of the electric motor 334, which would engage gears (not shown) preferably moulded into the shutter 332. Alternatively, a geared motor could operate scissors (not shown) which could extend and retreat as the polarity is reversed.

The shutter 332 may be fabricated from plastics material, or of any other suitable lightweight material, and when in the closed position would seal the window 332 against dirt, dust, rain and the like. On opening and closing the shutter 332, a felt or rubber wiper (not shown) which may be attached to the leading edge, would move across the window removing any grime, rainwater and the like.

The shutter 332 would be housed inboard, that is, the shutter would move across the window 330 to reside in the vehicle's door cavity or the mounting binnacle 316 of the housing 312. This would accommodate the asymmetric profile of the mirror assembly 310.

In normal driving conditions, the shutters 332 of both left and right assemblies 310 would be kept closed, avoiding the aforementioned confusion, distraction or dazzling. In addition, road dirt, stones, rain and the like are all deflected by the shutters 332. The driver has a choice, dictated by road conditions, driver preferences and the like, as to when he or she engages the forward view mirror feature.

For a right-hand drive vehicle, to activate the shutter 332 of the left or right assembly 310, a switching mechanism (not shown) is triggered by moving, for example, an indicator stalk, similar to those used for turn indicators. This could be pre-emptive to activating the indicator to signal a turn, and could work in the same format as used in existing indicators, that is, lifting the stalk up would open the shutter 332 of the left assembly 310, and moving the stalk down would activate the shutter 332 in the right-hand assembly 310.

An over-ride button (not shown) on the stalk, dashboard or elsewhere could keep one or both of the shutters 332 open, permanently if desired, or a time delay facility such as a relay switch may be provided to close the shutters 332 after a predetermined period of time, for example one minute.

Figure 15:
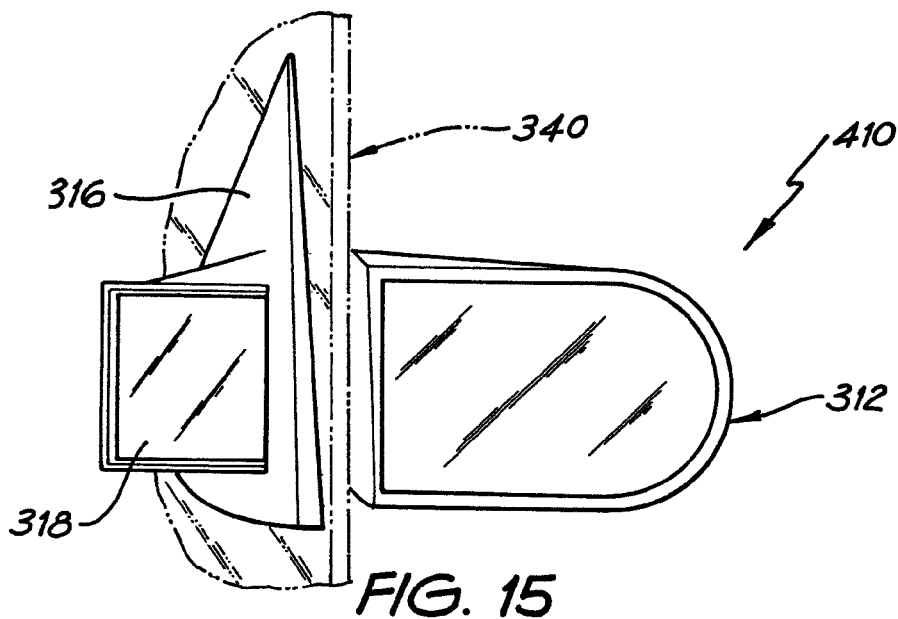
FIG. 15 is a rear elevation of a second embodiment of a forward-view assembly according to the present invention.
Figure 16:
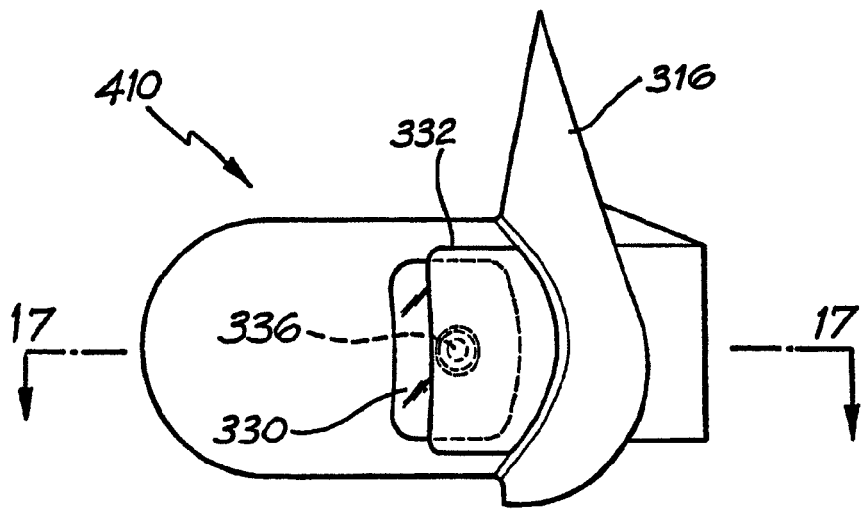
FIG. 16 is a front elevation of the assembly of FIG. 15.
Figure 17:
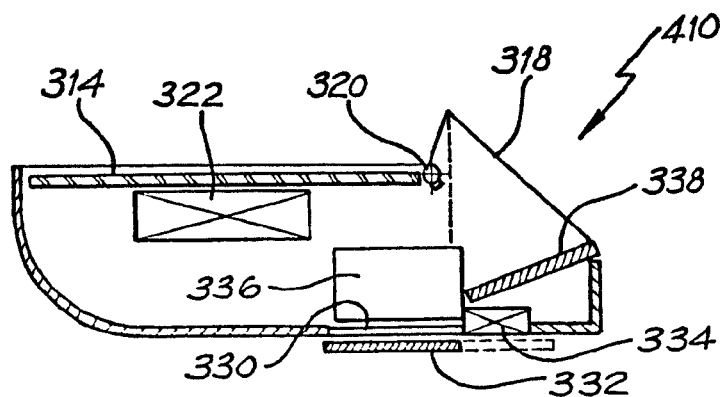
FIG. 17 is a section along the lines 17-17 of FIG. 16.

FIGS. 15 to 17 describe a further embodiment of the present invention, with the forward view mirror assembly being designated 410. All reference numerals used in FIGS. 12 to 14, and also used in FIGS. 15 to 17, show the same features. Features 324, 326 and 328 do not appear in FIGS. 15 to 17, and the section of FIG. 17 is along the lines 17-17 of FIG. 16.

In this further embodiment, the mirror arrangement of FIGS. 12 to 14 is replaced by a video camera 336, and a screen 338 for showing the image generated by the camera 336. The camera 336 is situated to point forwards, and the circuitry or the like (not shown) to connect it to the screen 338 (not shown) is conventional. Screen 338 may preferably be an LCD screen, and although being shown as visible through portal 318, it could be located across portal 318. The camera/screen arrangement 336/338 could be monochrome or black and white.

In every other aspect, the shutter 332 operates as described in relation to FIGS. 12 to 14.

In FIGS. 18 to 26, further embodiments of the present invention are shown. A rear view assembly 510 has a housing 512. A window 518 is located in the front face of housing 512. Window 518, which may be generally similar to transparent panel 8 of U.S. Pat. No. 4,268,120, permits light from the front of the vehicle, to which the assembly 510 may be attached, to pass through to the interior of the assembly 510. The window 518 may be proud of, flush with or recessed in the front surface of housing 512. It may be preferred for the window 518 to be recessed, to co-operate with the air flow producing means to be described later in this specification. The window may be formed from glass, plastics material, or any suitable material which is transparent or substantially transparent.

Figure 18:
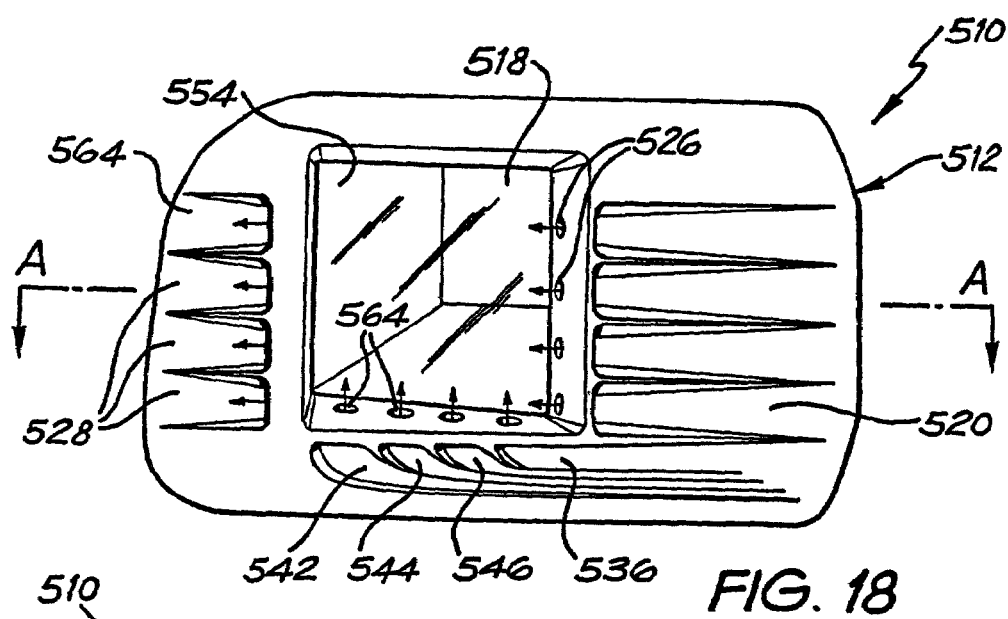
FIG. 18 is a rear elevation of a forward view assembly in accordance with another embodiment of the present invention.
Figure 19:
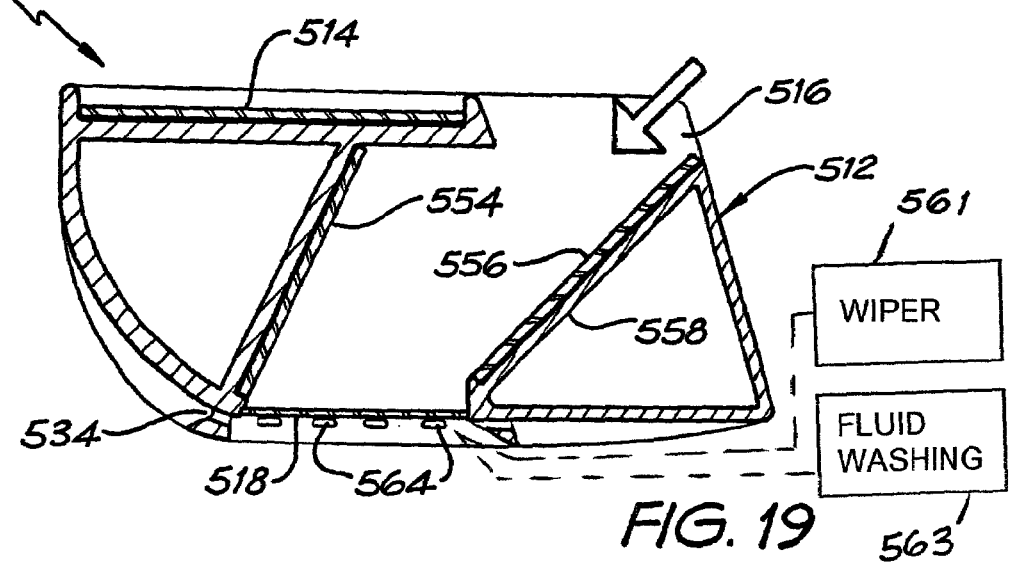
FIG. 19 is a section along the lines 19-19 of FIG. 18.

On the front and on the outer (in use) side of the housing 512 there are located means for directing air across the front of window 518. This air flow will be described in greater detail hereinafter in relation to FIG. 18, but the means includes channels 520 on the inner (in use) side of the rear of the housing 512. These channels are of increasing depth, as the result of ribs 522 increasing in height, towards the outer side of the housing 512. In FIGS. 18 and 19 it can be seen that the channels 520 end at a bulkhead 524, and that apertures 526 in that bulkhead 524 allow communication between the channels 520 and the window 518.

FIGS. 18 and 19 show that the outer side of housing 512 is provided with channels 528, which are generally similar to channels 520, being defined by ribs 530 and ending at a bulkhead 532, through which apertures 534 allow communication between channels 528 and window 518.

In FIG. 18 there is also shown a further channel 536, located at the base of the front side of housing 512. Channel 536 is defined by ribs 538, and directs air (as will be described hereinafter) into window 540. Smaller, angled channels 542, 544, 546 direct air through apertures 564 (FIGS. 18 and 19).

Turning now to FIG. 19, there is a first forward-view mirror 554 located within housing 512. Mirror 554 is preferably fixed within housing 512, but it is to be understood that it could be movable, by manual means, by an electric motor or by any other means. Second forward-view mirror 556 is also located within housing 512. Mirror 556 is preferably adapted to be movable for adjustment by an electric motor located in housing 512 behind mirror 556 at 558, but such a motor and its associated cabling and switching is not shown. If such a motor was used it may be substantially similar to those conventional arrangements used to adjust rear-view mirrors. Of course, any other form of adjustability may be used.

Figure 21:
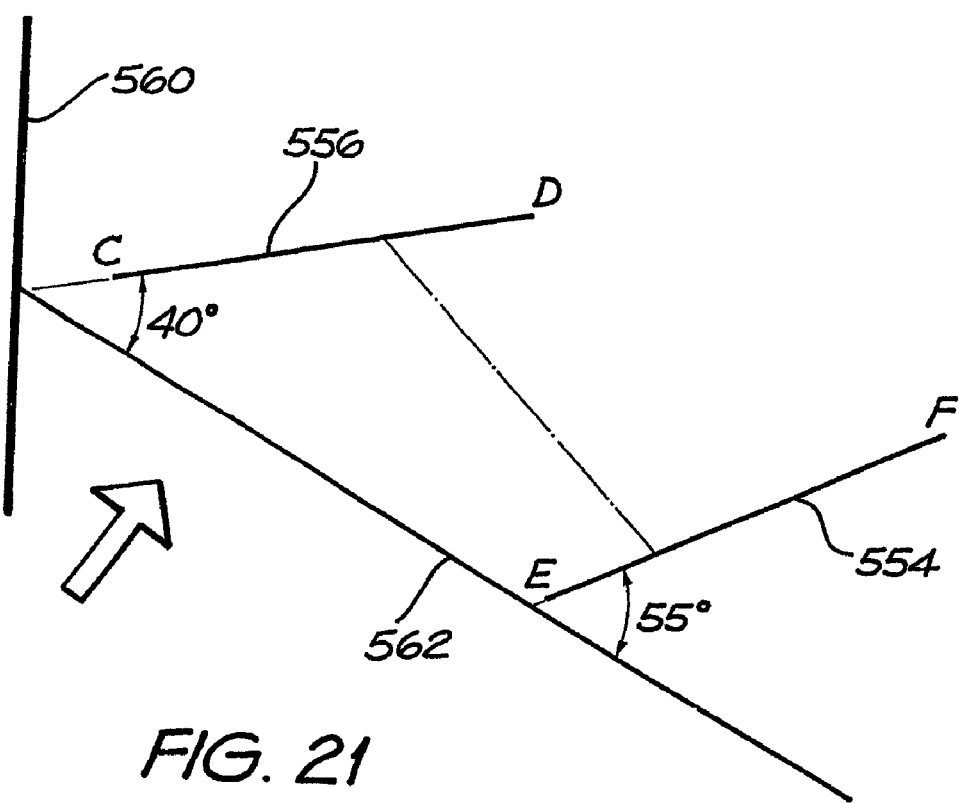
FIG. 21 is a diagrammatic view, showing the angles between two mirrors in the assembly of FIG. 18.

FIG. 21 shows a preferred angular arrangement for the mirror assembly of FIG. 19. 560 is the side of a right hand drive vehicle, and 562 is the line of the rear of a mirror assembly 510. It can be seen that the angle between mirror 556 and line 562 is 40°, and that between mirror 554 and line 562 is 55°. Of course, those angles are exemplary only, and even if the mirror 556 used the angle 40°, that angle would be likely in use to have to be adjusted to at least a small degree. There is an exemplary distance of 50 mm between mirrors 554 and 556.

Figure 22:
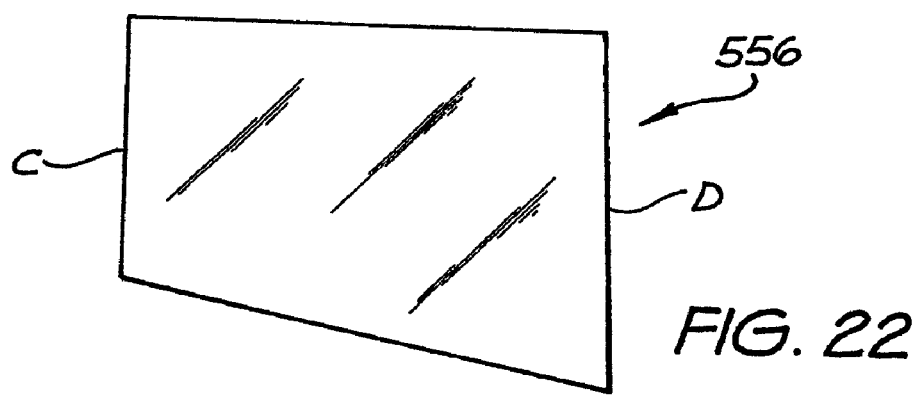
FIG. 22 is a plan view of one of the mirrors in the assembly of FIG. 18.
Figure 23:
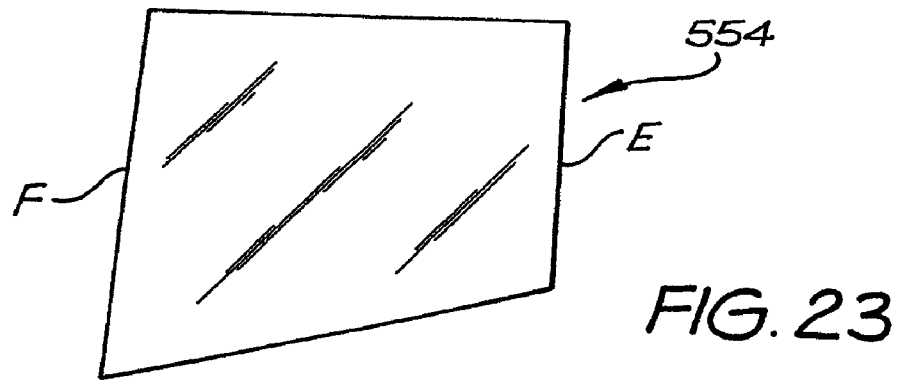
FIG. 23 is a plan view of the other one of the mirrors of FIG. 18.

FIGS. 22 and 23 show respectively plan views of mirrors 554 and 556, with preferred shapes. Mirror 556 is shown with sides C and D, which are also shown in FIG. 21. Those sides are preferably 50 mm and 67 mm long respectively, and the top and bottom are preferably 90 mm and 95 mm long respectively. Mirror 554 is shown with sides E and F, which are also shown in FIG. 21. Those sides are preferably 50 mm and 70 mm long respectively, and the top and bottom are preferably 80 mm and 87 mm long respectively. Of course, all of the angles and dimensions are exemplary only, and may be changed.

In use, a driver will look into the aperture 516 (FIG. 19) in the direction of the arrow in FIGS. 19 and 21, if the driver wishes to see ahead of the vehicle immediately in front of his or her vehicle. It will be seen from FIG. 19 in particular that mirror 556, the "image capturing" mirror, is located well outboard of the side of the vehicle, and is thus able to receive images from such a vehicle two vehicles in front. The light from that vehicle two vehicles in front passes through window 518, is reflected from mirror 556 to mirror 554, and then reflected from mirror 554 through aperture 516 to the eyes of the driver.

As has been stated, a similar unit may (in the case of a right hand drive vehicle) be located on the left hand side of the vehicle, to look forward along the left side of the vehicle. Preferably, both assemblies 510 would have mirror 556 adjustments by electric motors, operable from a position conveniently close to the driver.

The window 518 may become dirty, making any image seen by the driver to be extremely unclear. The present invention seeks to provide an improved arrangement to overcome such difficulties. Returning now to FIGS. 18 and 20, in particular FIG. 18, one is able to see the apertures 564 located at the base of window 518 in the front of housing 512, which apertures communicate with channels 536, 542, 544 and 546.

The small arrows in FIG. 18, running right to left and upwards, indicate the direction of air flow when the vehicle (not shown) is moving forwards. The consequent movement of the assembly 510 forwards through the air creates those air flows. Air striking channels 520/ribs 522 will be directed by channels 520 through apertures 526 and across window 518, right to left, as shown in FIG. 18. Air striking channels 538, 542, 544 and 546 is directed by those channels through apertures 564 across the outer surface of window 518, from the base towards the top, as shown in FIG. 18.

In particular, the flow of air along channels 528, a flow which may be regarded as tangential or generally tangential, induces a venturi effect. In that effect, a pressure differential in a fluid such as air is caused by a flow of that fluid past an area or location, reducing the pressure at that area or location. In turn, fluid at a higher pressure will be induced to flow through that area or location.

Figure 20:
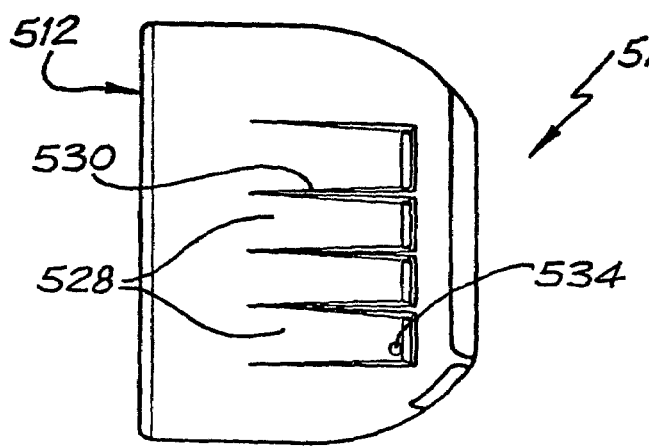
FIG. 20 is a side elevation of the assembly of FIG. 18.

In the embodiment of FIGS. 18 and 20, the fluid is of course air, and apertures 534 are venturis, with the lower pressure drawing in air from right to left in FIG. 18. At least some of the air drawn in through venturis 534 may be the air which is directed across the outer face of window 518. The streams of air exiting apertures 526 and heading in the direction of apertures 534, whether being at least partially induced or not, may create a curtain of air, flowing right to left in FIG. 18, which acts to remove water deposited by of rain, fog, sleet, snow and the like, and airborne and/or water-borne contaminants, such as dirt and mud, from adhering to window 518 and at least partially obscuring the forward view seen by the driver of the vehicle. That arrangement may be augmented by the flow of air upwards through apertures 564, or those air streams may create another curtain of air moving upwards across the face of window 518.

Of course, either of the arrangements of channels and apertures (520/526 and 538/542/544/546/564) may be omitted. Additional cleaning means may be used. At least one small wiper may be used to clean the window 518, and/or a window-washing arrangement using water or another fluid sprayed or otherwise applied to window 518 may be employed.

In addition, the window 518 may be fitted with demister elements of the electrically-powered type used in motor vehicle rear windows, or in any other form where heat is applied to the window to vaporise or defrost water on the surface(s) of the window 18, whether in the form of liquid water, ice or a slurry such as sleet.

Alternatively, hot or warm air or any other fluid may be piped to the body 512 of the assembly 510 from the vehicle's demister, to vaporise water from, or defrost, elements of the assembly 510, including window 518.

Figure 24:
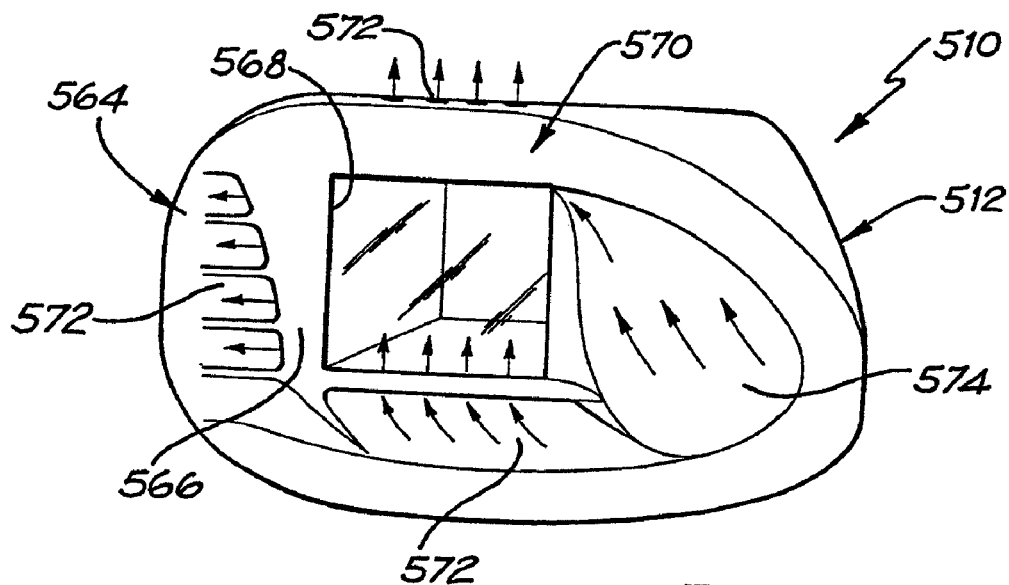
FIG. 24 is a front elevation of a further embodiment of a rear view mirror assembly in accordance with the present invention.
Figure 25:
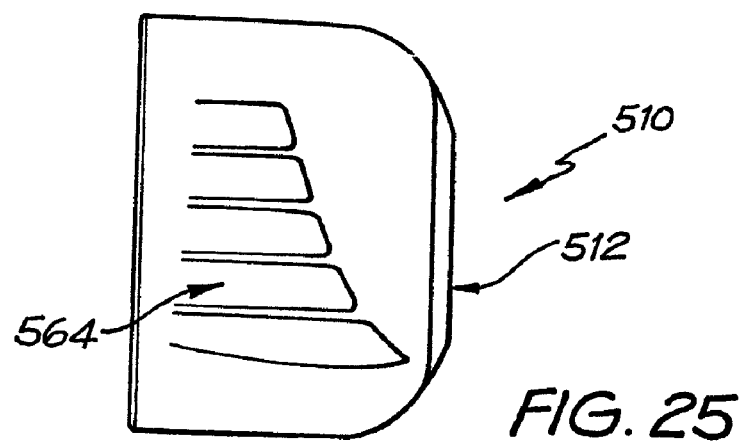
FIG. 25 is a side elevation of the assembly of FIG. 24.
Figure 26:
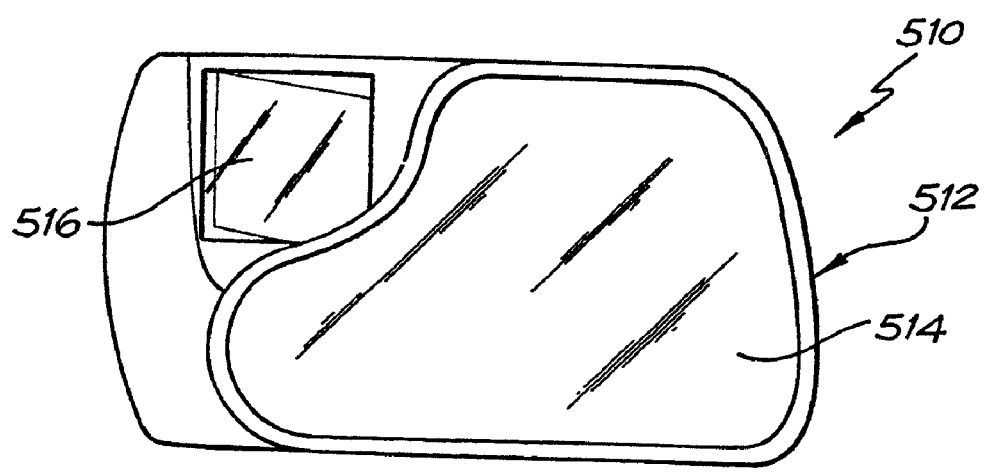
FIG. 26 is a rear elevation of the assembly of FIGS. 24 and 25.

The embodiment of FIGS. 24 to 26 inclusive includes a number of additional, optional, features. Features designated with the same reference numerals as those used in relation to FIGS. 18 to 23, designate the same features in FIGS. 24 to 26. Venturi drain 564 is generally similar to that shown in FIG. 20, and may be constituted by the same features. Optionally, on the end of body 512 where venturi drain 564 is located, a turn/hazard indicator light or the like may be mounted. More preferably, the indicator may be housed in the ribs 530 (FIG. 18) and/or on the floor of the body 512 between mirrors 554 and 556. This may be used as an added reflecting device, to direct the indicator light forwards and backwards.

Turning now to FIG. 24, a venturi slot and wing 566 is located on the front face of body 512, in much the same way as shown in FIGS. 18 and 19. Four additional venturi apertures or vents 568 allow air to flow across the inside of window 518 to minimise fogging on the window, and to remove water deposition or condensation on the inner surface.

The short arrows in FIG. 24 show the flow of air entering at the base of window 518, and flowing across the interior of the window 518, and exiting through venturi drain 564, or through the top of window 518 as shown.

Area 574 in FIG. 24 is a "catchment area" adapted to receive water such as rainwater and then channel it, as represented by the long arrows in FIG. 24, across the face of window 518, to keep window 518 clean. A top venturi slot and wing 570 is provided above window 518 for the extraction of water flowing from catchment 574. It should be noted that this cleaning mechanism, and all of the cleaning arrangements disclosed in this application, could be used with video camera based forward viewing arrangements, either with the simple location of such a camera located behind a window such as window 518, or by applying one or more such arrangements to a lens of the camera.

Optionally, one or both of mirrors 554, 556 may be tilted at an angle to a vertical plane. Such a degree of tilt may be between 5° and 10°. Preferably, mirror 554 may be tilted such that its top is tilted back compared to its base. Preferably, mirror 556 may be tilted such that its top is tilted away from the vehicle on which the assembly 510, in which the mirror 556 is located, is mounted. Of course, the tilt of each of the mirrors 554, 556 may be reversed, or both mirrors 554, 556 may have the same tilt.

It can be seen that this invention provides an improved forward viewing apparatus for motor vehicles.

The entire contents of the specifications (including drawings) of Australian provisional patent applications nos. 2003900638, filed 13 Feb. 2003, 2003903410, filed 4 Jul. 2003, and 2003906716, filed 5 Dec. 2003, are hereby incorporated into the present specification. The claims of this application form part of the disclosure of this specification.

The invention claimed is:

1. A two part forward view apparatus for a motor vehicle, said apparatus provides an image from a location forward of the apparatus, said image being able to be viewed by a driver of said vehicle, said apparatus comprising:
   a first part for fitting to an exterior of a door of the vehicle and a second part for fitting to an interior of the same door of the vehicle in opposing relation to the first part, with the door therebetween,
   a two-mirror arrangement, and a first one of the mirrors of said two-mirror arrangement has a curved surface,
   a window, and
   a viewing portal, and
   wherein light from a location forward of the apparatus passes through said window and is reflected by said two-mirror arrangement through the viewing portal to eyes of the driver of the vehicle,
   wherein said viewing portal is located on an inboard side of said apparatus in said second part,
   wherein said viewing portal is adapted to be viewed from within an interior structure of said vehicle, rather than through a window of said vehicle, and
   wherein a second inboard one of said mirrors is located within the interior structure of the vehicle in said second part, and
   wherein the first one of said mirrors is located exteriorly of said door in said first part.

2. Forward view apparatus according to claim 1, wherein said portal provides communication between the interior of said vehicle and an interior of said apparatus, such that ambient temperature of the interior of said vehicle influences temperature of the interior of said apparatus.

3. Forward view apparatus according to claim 1, further comprising a shape and configuration to achieve, when said vehicle is in forward motion, an air flow across the window of said apparatus for removal of water and other material.

4. Forward view apparatus according to claim 3, wherein said shape and configuration include a construction to produce two intersecting air flows.

5. Forward view apparatus according to claim 4, wherein said construction employs a venturi effect in the production of an air flow.

6. Forward view apparatus according to claim 3, wherein said shape and configuration include a first channel for directing air across the window of said apparatus.

7. Forward view apparatus according to claim 6, wherein said arrangement also includes a second channel utilising a venturi effect to induce air to flow from an outer surface of said window of said two mirror arrangement, such that the air flow produced by said first channel is enhanced.

8. Forward view apparatus according to claim 7, wherein said second channel is located generally on an outer side of said apparatus, and air flow created by forward movement of said vehicle is generally tangential to said second channel.

9. Forward view apparatus according to claim 3, further comprising an additional cleaning arrangement to clean said window of said two mirror arrangement.

10. Forward view apparatus according to claim 9, wherein said additional cleaning arrangement includes at least one of:
    a wiper of the type used as a windscreen wiper, and
    a device to apply a fluid to the outer surface of said window of said two mirror arrangement.

* * * * *